(12) United States Patent
Takezawa

(10) Patent No.: US 7,059,746 B2
(45) Date of Patent: Jun. 13, 2006

(54) ILLUMINATION DEVICE AND PROJECTOR EQUIPPING THE SAME

(75) Inventor: Takeshi Takezawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 204 days.

(21) Appl. No.: 10/798,275

(22) Filed: Mar. 12, 2004

(65) Prior Publication Data

US 2004/0257813 A1  Dec. 23, 2004

(30) Foreign Application Priority Data

Mar. 25, 2003  (JP) .............................. 2003-082894

(51) Int. Cl.
*F21K 7/00* (2006.01)

(52) U.S. Cl. ...................... 362/252; 362/300; 362/303; 353/98

(58) Field of Classification Search ................ 362/252, 362/255–256, 300, 303; 353/52–61, 98, 353/99
See application file for complete search history.

(56) References Cited

U.S. PATENT DOCUMENTS 1,232,046 A * 7/1917 Keinert ........................ 362/277

FOREIGN PATENT DOCUMENTS

| JP | A-5-251054 | 9/1993 |
| JP | A-8-31382 | 2/1996 |
| JP | A 9-120067 | 5/1997 |
| JP | A-11-31403 | 2/1999 |
| JP | 2001-222976 | 8/2001 |
| JP | 2002-222601 | 8/2002 |
| JP | 2004-79225 | 3/2004 |

* cited by examiner

*Primary Examiner*—Renee Luebke
*Assistant Examiner*—Leah S Lovell
(74) *Attorney, Agent, or Firm*—Oliff & Berridge, PLC

(57) ABSTRACT

An illumination device including a light-emitting tube having a light-emitting member in which light emission is carried out between a pair of electrodes and sealing members located on both sides of the light-emitting member, a first reflecting mirror to hold the light-emitting tube, reflect the light emitted from the light-emitting tube, and direct the light forward, and a transparent plate disposed in a distal end portion of the first reflecting mirror, a second reflecting mirror that encloses a front portion of the light-emitting member and reflects the light from the light-emitting member toward the first reflecting mirror being fixed to at least one of the sealing member and the transparent plate, the transparent plate and the second reflecting mirror are brought into contact or fixedly attached to each other, and at least one of the transparent plate and the second reflecting mirror is brought into contact or fixedly attached to the sealing member.

54 Claims, 10 Drawing Sheets (F1)

ILLUMINATION DEVICE AND PROJECTOR EQUIPPING THE SAME

BACKGROUND OF THE INVENTION

1. Field of Invention

The present invention relates to an illumination device including a light-emitting tube and a reflecting mirror to reflect the light emitted from the light-emitting tube, and to a projector using such an illumination device.

2. Description of Related Art

Illumination devices composed of a light-emitting tube and a reflecting mirror to direct the light emitted from the light-emitting tube in the prescribed direction have been widely used as illumination devices. In such illumination devices, an auxiliary second reflecting mirror have been provided in a position opposite to the aforementioned reflecting mirror so as to sandwich the light-emitting tube, as described in JP-A-8-31382 (page 2, FIG. 1), in order to effectively use the light that was emitted from the light-emitting tube but became a stray light and could not be supplied for use.

SUMMARY OF THE INVENTION

However, when the auxiliary second reflecting mirror is mounted on the light-emitting tube so as to surround the periphery of the light-emitting member of the light-emitting tube, the second reflecting mirror acts to reduce heat radiation from the light-emitting tube. Therefore, the problem is that the temperature of the light-emitting tube had a non-uniform distribution and the temperature is greatly increased locally, thereby causing wear of electrodes, opacity and expansion of the light-emitting tube, and shortening of service life of the light-emitting tube.

The invention was developed to address the aforementioned problems, and in an aspect provides an illumination device including a light-emitting tube, a first reflecting mirror which is the main reflecting mirror for the light emitted from the light-emitting tube, and a transparent plate disposed in the distal end portion of the first reflecting mirror. This illumination device includes the light-emitting tube in which the degradation of service life and reliability caused by the second reflecting mirror can be reduced or prevented even when the second reflecting mirror, which is the auxiliary reflecting mirror, is disposed so as to surround the periphery of the light-emitting member of the light-emitting tube. An aspect of the invention also provides a projector including such an illumination device.

The illumination device in accordance with an aspect of the invention is an illumination device including a light-emitting tube having a light-emitting member and sealing members located on both sides of the light-emitting member, the light emitting-member including a pair of electrodes, light emission is carried out between the pair of electrodes, a first reflecting mirror to hold the light-emitting tube, reflect the light emitted from the light-emitting tube, and direct the light forward, and a transparent plate disposed in the distal end portion of the first reflecting mirror, the illumination device includes a second reflecting mirror that encloses a front portion of the light-emitting member and reflects the light from the light-emitting member toward the first reflecting mirror, the second reflecting mirror is fixedly attached to at least one of the sealing member and the transparent plate, the transparent plate and the second reflecting mirror are brought into contact or fixedly attached to each other, and at least one of the transparent plate and the second reflecting mirror is brought into contact or fixedly attached to the sealing member. As a result, most of the light from the light-emitting tube that usually became stray light can be returned to the first reflecting mirror via the second reflecting mirror and supplied for use and the heat of the light-emitting tube can be radiated by heat conduction to the transparent plate or via the second reflecting mirror to the transparent plate, thereby making it possible to prevent or reduce the increase in temperature of the light-emitting tube even if heat generation caused by the installation of the second reflecting mirror is increased.

Another illumination device in accordance with an aspect of the invention is an illumination device including a light-emitting tube having a light-emitting member and sealing members located on both sides of the light-emitting member, the light-emitting member including a pair of electrodes, light emission is carried out between the pair of electrodes, a first reflecting mirror to hold the light-emitting tube, reflect the light emitted from the light-emitting tube, and direct the light forward, and a transparent plate disposed in the distal end portion of the first reflecting mirror. The illumination device includes a second reflecting mirror that encloses the front portion of the light-emitting member and reflects the light from the light-emitting member toward the first reflecting mirror and is fixedly attached to the transparent plate and a gap is provided between the transparent plate, second reflecting mirror, and light-emitting tube. As a result, most of the light from the light-emitting tube that usually becomes stray light can be returned to the first reflecting mirror via the second reflecting mirror and supplied for use and the light-emitting tube can be cooled with the air passing through the gap, thereby making it possible to prevent or reduce the increase in temperature of the light-emitting tube even if heat generation caused by the installation of the second reflecting mirror is increased.

The aforementioned fixed attachment may be carried out with an adhesive.

With the above-described structures, fixed attachment with better adhesiveness can be attained with an adhesive, the second reflecting mirror can be strongly fixed, and heat radiation ability by heat conduction from the light-emitting tube to the transparent plate can be increased.

Another illumination device in accordance with an aspect of the invention is an illumination device including a light-emitting tube having a light-emitting member and sealing members located on both sides of the light-emitting member, the light-emitting member including a pair of electrodes, light emission is carried out between the pair of electrodes, a first reflecting mirror to hold the light-emitting tube, reflect the light emitted from the light-emitting tube, and direct the light forward, and a transparent plate disposed in the distal end portion of the first reflecting mirror. The illumination device includes a second reflecting mirror that encloses a front portion of the light-emitting member and reflects the light from the light-emitting member toward the first reflecting mirror, the second reflecting mirror is formed integrally with the transparent plate.

As a result, because the second reflecting mirror and the transparent plate are formed integrally, the second reflecting mirror can be fixed by disposing the transparent plate on the first reflecting mirror. Therefore, heat of the second reflecting mirror is transferred to the transparent plate by radiation and conduction, thereby making it possible to prevent or reduce the increase in temperature of the light-emitting tube even if heat generation caused by the installation of the second reflecting mirror is increased.

Another illumination device in accordance with an aspect of the invention is an illumination device including a light-emitting tube having a light-emitting member and sealing members located on both sides of the light-emitting member, the light-emitting member including a pair of electrodes, light emission is carried out between a pair of electrodes, a first reflecting mirror to hold the light-emitting tube, reflect the light emitted from the light-emitting tube, and direct the light forward, and a transparent plate disposed in the distal end portion of the first reflecting mirror. The illumination device includes a second reflecting mirror that encloses the front portion of the light-emitting member and reflects the light from the light-emitting member toward the first reflecting mirror and the second reflecting mirror is disposed opposite to an outer peripheral surface of the light-emitting member with a gap being formed therebetween and is fixedly attached by being pressed against an outer periphery of the sealing member in the vicinity of the light-emitting member with a spring wound around the outer peripheral surface with a gap therebetween. As a result, most of the light from the light-emitting tube that usually becomes stray light can be returned to the first reflecting mirror via the second reflecting mirror and supplied for use and the light-emitting tube can be cooled with the air passing through the gap, thereby making it possible to prevent or reduce the increase in temperature of the light-emitting tube even if heat generation caused by the presence of the second reflecting mirror is increased.

The spring may be composed of an electrically conductive coil and one end of the electrically conductive coil be connected to a lead wire led out from a sealing member on a side opposite to that where the spring is disposed. As a result, the spring is employed for insulation breakdown inside the light-emitting tube at the time of light emission initiation in the light-emitting tube and the ignition ability of the light-emitting tube can be enhanced.

Further, the transparent plate may be fixedly attached to the sealing member with an adhesive. As a result, because heat radiation is additionally provided by heat conduction from the light-emitting tube to the transparent plate, the increase in temperature of the light-emitting tube can be effectively reduced or prevented.

Moreover, the transparent plate may be composed of either a transparent material with a low thermal expansion coefficient or a transparent material with a high thermal conductivity. A substrate of the second reflecting mirror may be composed of either a material with a low thermal expansion coefficient or a material with a high thermal conductivity. Because the transparent plate and/or second reflecting mirror is composed of a material with a low thermal expansion coefficient or a high thermal conductivity, heat-induced deformation or transformation of the transparent plate disposed in the distal end portion of the first reflecting mirror or the substrate of the second reflecting mirror facing the first reflecting mirror can be advantageously reduced or prevented.

Fixed attachment of the transparent plate and the sealing member, the second reflecting mirror and the sealing member, or the transparent plate and the second reflecting mirror may be carried out via an aluminum nitride-based adhesive or an adhesive based on a mixture of silica and alumina. As a result, because an inorganic adhesive is used, heat resistance and light resistance are ensured. Because aluminum-nitride-based adhesive has good thermal conductivity, heat radiation from the light-emitting tube to transparent plate is enhanced.

Further, a heat radiation fin may be provided at the outer peripheral portion of the transparent plate. As a result, heat radiation surface of the transparent plate is increased and heat radiation from the light-emitting tube is enhanced.

Further, one end of the sealing member may protrude from the region surrounded by the first reflecting mirror and the transparent plate through the transparent plate into an open region. Because one end of the sealing member is in a space on the open side, spacing is provided with the transparent plate between the light-emitting member which is a heat source and the protruding sealing member, the effect of high-temperature air surrounding the light-emitting member, which is a heat source, is reduced or prevented, and cooling performance of one end of the sealing member is enhanced.

The projector in accordance with an aspect of the invention is a projector including an illumination device and a light modulation device to receive an incident light from the illumination device and modulate the incident light according to a given image information, this projector includes any of the above-described illumination devices is provided as the aforementioned illumination device. As a result, a high-brightness projector with a long service life is obtained.

DETAILED DESCRIPTION OF EXEMPLARY EMBODIMENTS

Figure 1:
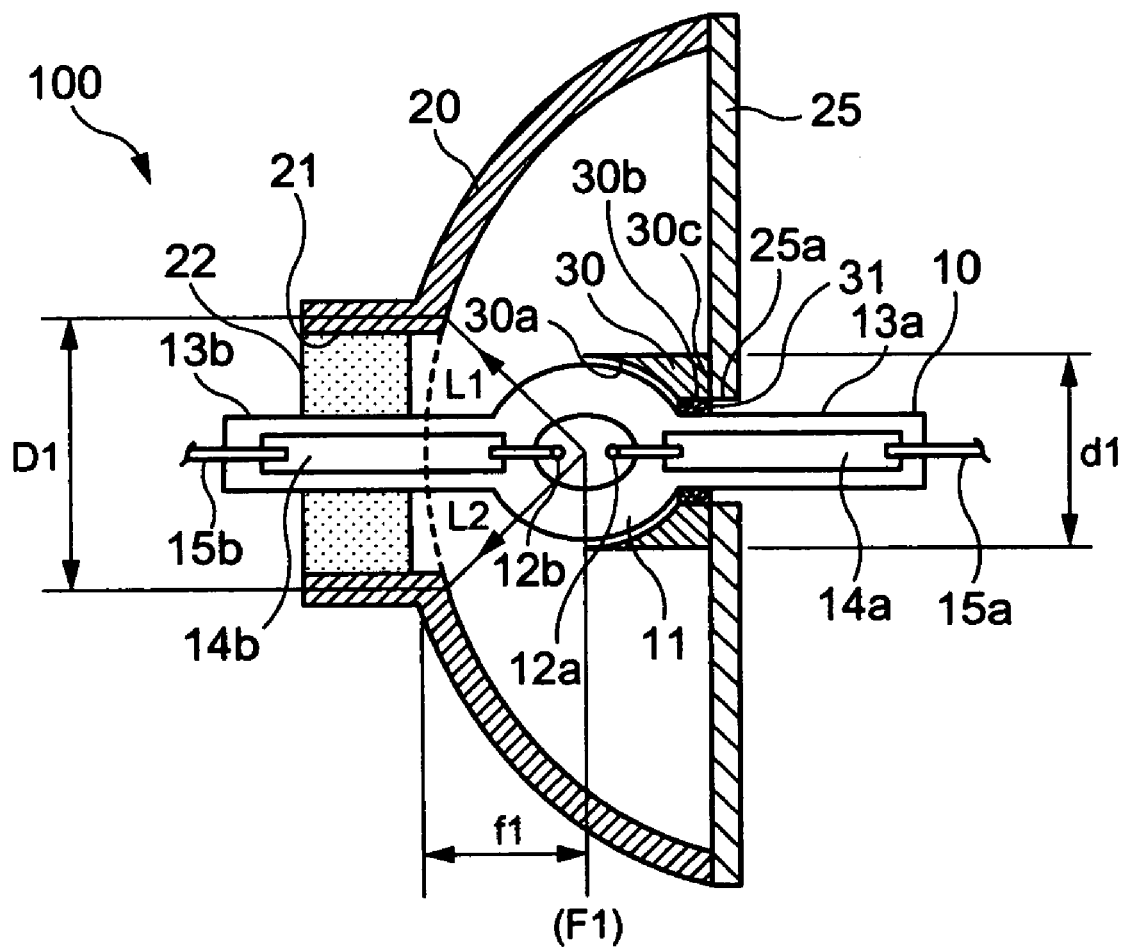
FIG. 1 is a schematic of the illumination device of exemplary Embodiment 1 of the invention.

The exemplary embodiments of the invention will be described hereinbelow with reference to the drawings. In the drawings, identical reference symbols denote identical or equivalent components.

Exemplary Embodiment 1

Figure 2:
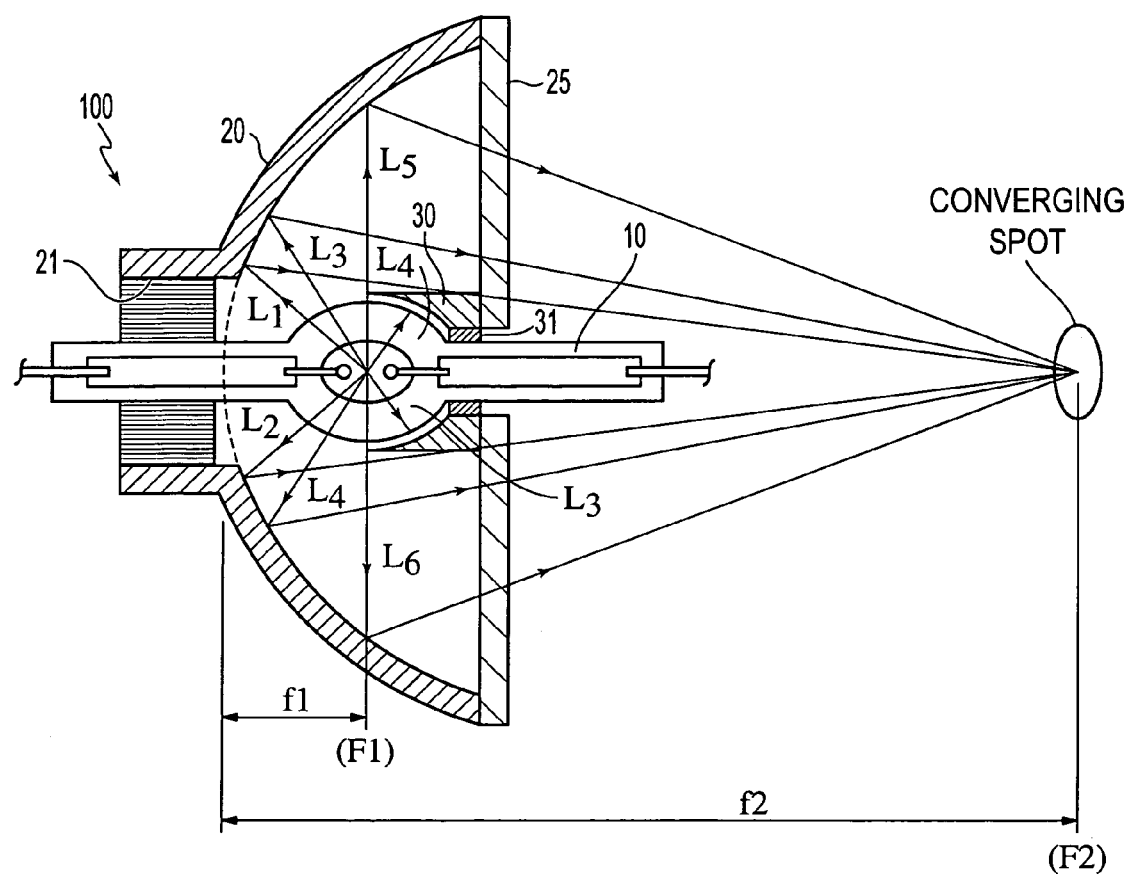
FIG. 2 is a schematic illustrating the operation of the illumination device shown in FIG. 1.

FIG. 1 is a schematic of an illumination device 100 of exemplary Embodiment 1 of the invention. FIG. 2 is a schematic illustrating the operation of the device 100 shown in FIG. 1.

The illumination device 100 includes a light-emitting tube 10, a first reflecting mirror 20 which is the main reflecting mirror of the illumination device 100, a transparent plate 25, and a second reflecting mirror 30 which is an auxiliary reflecting mirror of the illumination device 100. The light-emitting tube 10 is made from a quartz glass or the like and includes inside thereof a pair of tungsten electrodes 12, 12, a central light-emitting member 11 having mercury, rare gas, and a small amount of a halogen sealed therein, a sealing member 13a located in front of the light-emitting member 11 and a sealing member 13b located behind the light-emitting member so as to sandwich the light-emitting member 11. Metal foils 14a, 14b composed of molybdenum and connected to a pair of electrodes 12a, 12b, respectively, are sealed in the sealing members 13a, 13b, respectively. Those metal foils 14a, 14b are provided with respective lead wires 15a, 15b led out to the outside. Further, the connection tips of the lead wires 15a, 15b are connected to external connection terminals provided, for example, on an illumination device fixing jig (not shown in the figure), in the same manner as in a related art configuration.

If an antireflective coating of a multilayer film including a tantalum oxide film, a hafnium oxide film, a titanium oxide film, and the like is formed on the outer peripheral surface of the light-emitting member 11. Then loss of light caused by reflection of light passing therethrough can be reduced or prevented.

The first reflecting mirror 20 is a reflecting element disposed behind the light-emitting member 11 in the longitudinal direction of the light-emitting tube 10 in the illumination device 100 including the light-emitting tube 10 and includes a through orifice 21 to fix the light-emitting tube 10 in the central part thereof. The light-emitting tube 10 is inserted into the through orifice 21 of the first reflecting mirror 20 so that the axis of the light-emitting tube 10 and the axis of the first reflecting mirror 20 coincide and are fixedly attached and held therein with an inorganic adhesive agent 22, such as cement. The axis of the light-emitting tube 10, as referred to herein, is a central axis in the longitudinal direction of the light-emitting tube 10 and substantially coincides with the line connecting the electrode 12a with the electrode 12b. Furthermore, the axis of the first reflecting mirror 20, as referred to herein, is a rotation axis of a rotation curve constituting the reflective surface of the first reflecting mirror 20 and substantially coincides with the central axis of a luminous flux emitted from the illumination device 100. Further, when the reflective surface of the first reflecting mirror 20 is in the form of an ellipsoid of revolution, the center (center between the electrodes 12, 12) of the light-emitting member 11 of the light-emitting tube 10 coincides with a first focal point (F1) thereof or is located in the vicinity of the first focal point. When the reflective surface of the first reflecting mirror 20 is a paraboloid of revolution, the center coincides with the focal point F thereof or is located in the vicinity of the focal point. Thus, the center of the light-emitting member 11 is disposed close to the focal point F1 or F of the first reflecting mirror 20 or substantially matches the position of the focal point F1 or F. In the present example, the reflective surface of the first reflecting mirror 20 is in the form of an ellipsoid of revolution. F1, F2 stand for a first focal point and a second focal point, respectively, of the curve of the ellipsoid of revolution of the reflective surface of the first reflecting mirror 20, f1, f2 denote the distance from the apex of the rotation curve of the reflective surface of the first reflecting mirror 20 to the first focal point F1 and second focal point F2, respectively. The reflective surface of the first reflecting, mirror 20 may have a shape other than that of the ellipsoid of revolution.

The transparent plate 25 is a member disposed in the distal end portion (opening side) of the first reflecting mirror 20 and basically serves to reduce or prevent scattering of the light-emitting tube 10 if it fractures. Usually, the transparent plate is mounted without a gap on the periphery of the distal end portion of the first reflecting mirror 20. However, it may be also mounted with a gap with respect to the periphery of the distal end portion of the first reflecting mirror 20. The transparent plate 25 is composed of quartz, PYREX (trade name) glass with a low thermal expansion coefficient or a material with a high thermal conductivity such as sapphire, crystal quart, YAG, and fluorite. A through orifice 25a is provided in the central portion of the transparent plate 25. One end of the sealing member 13a of the light-emitting tube 10 is passed through the transparent plate 25, led out from the through orifice 25a to the outside of the region surrounded by the first reflecting mirror 20 and transparent plate 25, and exposed.

The second reflecting mirror 30 is a reflecting element disposed in front of the light-emitting member 11 in the illumination device 100 including the light-emitting tube 10 and is disposed so that the reflective surface 30a thereof encloses almost half of the front side of the light-emitting member 11. The incident light exiting from the center of the light-emitting member 11 and falling on the second reflecting mirror 30 and normal to the reflective surface 30a of the second reflecting mirror 30 coincide. Because the structure (location between the electrodes 12, 12, shape of components of the light-emitting member 11) of the light-emitting member 11 differs for each light-emitting tube 10 due to variations in production, the shape of the reflective surface 30a of the second reflecting mirror 30 may be determined for each light-emitting tube 10 according to the relationship with the light-emitting member 11.

Fixing of the second reflecting mirror 30 to the sealing member 13a will be described below.

Because the second reflecting mirror 30 is exposed to a high temperature of about 900 to 1000° C., it has to be manufactured from a material with excellent heat resistance. For example, if the second reflecting mirror 30 is manufactured using quartz and PYREX (trade name) glass which have a low thermal expansion coefficient or sapphire, crystal quartz, YAG ($Y_3Al_5O_{12}$), and fluorite which have a high thermal conductivity, then heat-induced deformation or transformation can be reduced or prevented. Moreover, because the UV and IR transmissivity is good, temperature increase in the second reflecting mirror 30 can be also reduced or prevented.

If the reflective surface 30a of the second reflecting mirror 30 can reflect only visible light which is to be used for illumination and passes UV and IR radiation which are unnecessary for illumination, then heat generated in the second reflecting mirror 30 can be reduced. For this purpose, a dielectric multilayer film which reflects only visible light and passes UV and IR radiation is laminated on the reflective surface 30a of the second reflecting mirror 30. The dielectric multilayer film is also required to have heat resistance and can be composed, for example, of inter lamination of tantalum compound and $SiO_2$, or inter lamination of hafnium compound and $SiO_2$.

It is preferred that the outer surface of the second reflecting mirror 30 be molded so as to transmit the incident light (UV, IR, visible light that leaked from the side of the reflective surface 30a, and the like) that was not reflected by the reflective surface 30a or be provided with a reflective film that diffusion reflects the incident light that was not reflected by the reflective surface 30a or shaped so as to provide for such diffusion reflection, thereby minimizing the absorption of light by the second reflecting mirror 30.

Further, as shown in FIG. 1, a diameter d1 of the outer surface of the second reflecting mirror 30 is set so that a diameter D1 of the cone at the reflective surface of the first reflecting mirror 20, which is indicated by usability limit light L1, L2 emitted from the light-emitting member 11 at the side of the first reflecting mirror 20, that is, on the rear side of the illumination device 100, is larger than the diameter d1 of the outer surface of the second reflecting mirror 30, and that the diameter d1 of the outer surface of the second reflecting mirror 30 has a size so as to fit into the cone formed by the light produced by reflection of the usability limit light L1, L2 by the first reflecting mirror 20. As a result, of the light emitted from the light-emitting member 11 to the rear side of the illumination device 100, the light which is within the usability range is reflected by the first reflecting mirror 20 and then can propagate without being shielded by the second reflecting mirror 30.

The usability limit light L1, L2 is defined as the light emitted from the light-emitting member 11 to the rear side of the illumination device 100 which corresponds to inner boundaries of the range that can be actually used as the illumination light and is sometimes determined by the structure of the light-emitting tube 10 and sometimes by the structure of the first reflecting mirror 20. The usability limit light determined by the structure of the light-emitting tube 10 is an effective light on the boundary with the light that is shielded under the effect of the sealing member 13b or the like, of the light that is emitted from the light-emitting member 11 to the first reflecting mirror 20 side, that is, to the rear side, and is emitted as an effective light without being shielded under the effect of the sealing member 13b or the like. Further, the usability limit light determined by the structure of the first reflecting mirror 20 is an effective light on the boundary with the light that cannot be reflected by the reflective surface of the first reflecting mirror 20 because of the first reflecting mirror 20 featuring the presence of the through orifice 21 of the first reflecting mirror 20 and cannot be used as the illumination light, of the light that is emitted from the light-emitting member 11 to the first reflecting mirror 20 side, that is, to the rear side of the illumination device 100, and is emitted as an effective light without being shielded under the effect of the sealing member 13b or the like. When the aforementioned usability limit light is taken as a limit light determined by the structure of the light-emitting tube 10, the present embodiment makes it possible to use almost the entire light emitted from the light-emitting member 11 to the rear side of the illumination device 100.

If the diameter d1 of the outer surface of the second reflecting mirror 30 increases, shielding of the light propagating forward after reflection from the first reflecting mirror 20 increases, thereby reducing light utilization ratio. Therefore, in order to avoid the reduction of light utilization ratio, the diameter d1 of the outer surface of the second reflecting mirror 30 should be made as small as possible.

The illumination device 100 of the above-described configuration operates as follows. Thus, as shown in FIG. 2, the light L1 L2, L5, L6 emitted from the rear side with respect to the center of the light-emitting member 11 of the light-emitting tube 10, is reflected by the first reflecting mirror 20 and directed forward of the illumination device 100. Furthermore, the light L3, L4 emitted from the front side with respect to the center of the light-emitting member 11 is reflected by the second reflecting mirror 30, returns to the first reflecting mirror 20, then is reflected by the first reflecting mirror 20 and directed forward of the illumination device 100. As a result, almost the entire light emitted from the light-emitting member 11 can be used.

Because the above-described second reflecting mirror 30 is used in the aforementioned manner, the luminous flux emitted from the light-emitting member 11 to the side (forward side) opposite to the first reflecting mirror 20 can be reflected by the second reflecting mirror 30 to the rearward side so as to fall on the reflective surface of the first reflecting mirror 20. Therefore, even if the reflective surface of the first reflecting mirror 20 is small, almost the entire luminous flux emitted from the light-emitting member 11 can be converged in a certain position and emitted, and the size of the first reflecting mirror 20 in the optical axis direction and the aperture thereof can be decreased. Thus, the illumination device 100 and projector 1000 can be miniaturized and a layout in which the illumination device 100 is contained inside the projector 1000 can be easily implemented.

Further, because providing the second reflecting mirror 30, almost the entire light emitted from the light-emitting member 11 can be focused in the second focal point by the first reflecting mirror 20 and second reflecting mirror 30 and used and the light utilization efficiency can be greatly increased, even if the first focal point F1 and second focal point F2 of the first reflecting mirror 20 are bought close to each other to decrease the focusing spot diameter at the second focal point F2. Therefore, the light emitted from the illumination device 100 easily enters the next optical system and the light utilization ratio can be further increased.

Fixing of the second reflecting mirror 30 and sealing member 13a will be described below.

The second reflecting mirror 30 is provided with a through hole 30b to fix the light-emitting tube 10 in the central portion of the reflective surface 30a. The second reflecting mirror 30 is fixedly attached with an adhesive 31 to the sealing member 13b of the light-emitting tube 10 inserted in the through hole 30b, in a state in which the axis of the light-emitting tube 10 and the axis of the second reflecting mirror 30 coincide. Furthermore, the second reflecting mirror 30 includes a surface 30c facing the transparent plate 25. The surface 30c of the second reflecting mirror 30 is brought into contact with the transparent plate 25. The surface 30c of the second reflecting mirror 30 and the transparent plate 25 may be bonded together with an adhesive.

With the configuration of the above-described exemplary Embodiment 1, the second reflecting mirror 30 is fixedly attached with the adhesive 31 to the sealing member 13a of the light-emitting tube 10. Because the second reflecting mirror 30 is also in contact with the transparent plate 25, heat generated by the light-emitting member 11 is transferred from the sealing member 13b of the light-emitting tube 10 to the transparent plate 25 via the adhesive 31 and the second reflecting mirror 30. Furthermore, if the second reflecting mirror 30 and the transparent plate 25 are not simply brought into contact, but fixedly attached to each other with an adhesive, then the second reflecting mirror 30 and the transparent plate 25 are reliably brought into contact and heat transfer from the light-emitting tube 10 to the second reflecting mirror is facilitated, thereby further improving heat radiation ability of the light-emitting tube 10.

Therefore, heat of the light-emitting tube 10 is radiated by heat conduction to the transparent plate 25 via the adhesive 31 and second reflecting mirror 30. Therefore, installing the second reflecting mirror 30 in the light-emitting tube 10 makes it possible to reduce or prevent an increase in temperature of the light-emitting tube 10 even if heat radiation from the light-emitting member 11 is impeded.

As described hereinabove, in the illumination device 100 of Embodiment 1, heat generated in the light-emitting tube 10 is radiated into the transparent plate 25 by using heat conduction, and the increase in temperature of the light-emitting tube 10 caused by the installation of the second reflecting mirror 30 is prevented.

Exemplary Embodiment 2

Figure 3:
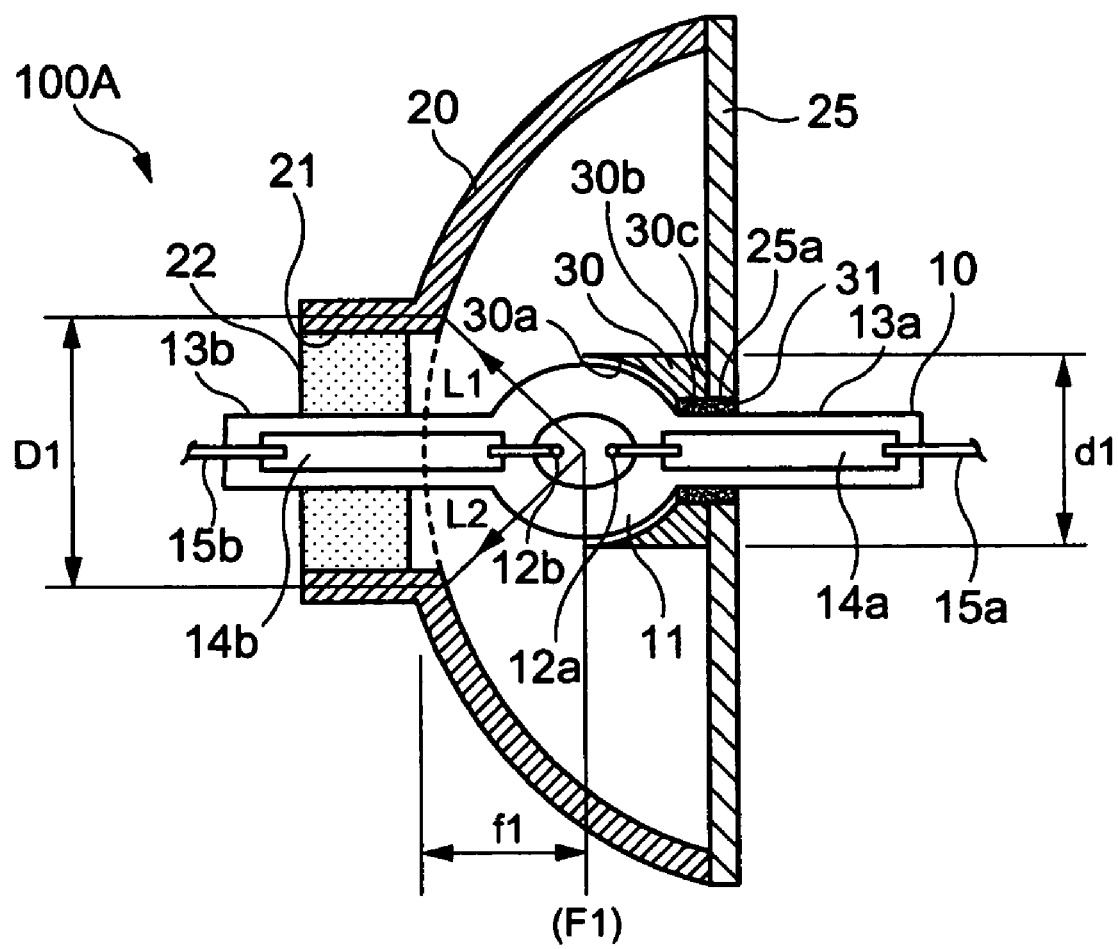
FIG. 3 is a schematic of the illumination device of of exemplary Embodiment 2 of the invention.

FIG. 3 is a schematic of an illumination device 100A of exemplary Embodiment 2. The configuration of the illumination device 100A is basically identical to that of the illumination device 100 of exemplary Embodiment 1 shown in FIG. 1 and FIG. 2 and differs from the illumination device 100 of exemplary Embodiment 1 in the following aspects.

Both a through orifice 25a of the transparent plate 25 and a through orifice 30b of the second reflecting mirror 30 are fixedly attached and fixed to the sealing member 13a of the light-emitting tube 10 with the adhesive 31.

With the configuration of exemplary Embodiment 2, in addition to the effect of the above-described exemplary Embodiment 1, heat is radiated because heat from the light-emitting tube 10 is conducted directly to the transparent plate 25 via the adhesive 31. Therefore, the surface area through which heat is conducted from the light-emitting tube 10 is enlarged with respect to that of exemplary Embodiment 1, thereby providing for better reduction or prevention of the increase in temperature of the light-emitting tube 10.

Exemplary Embodiment 3

Figure 4:
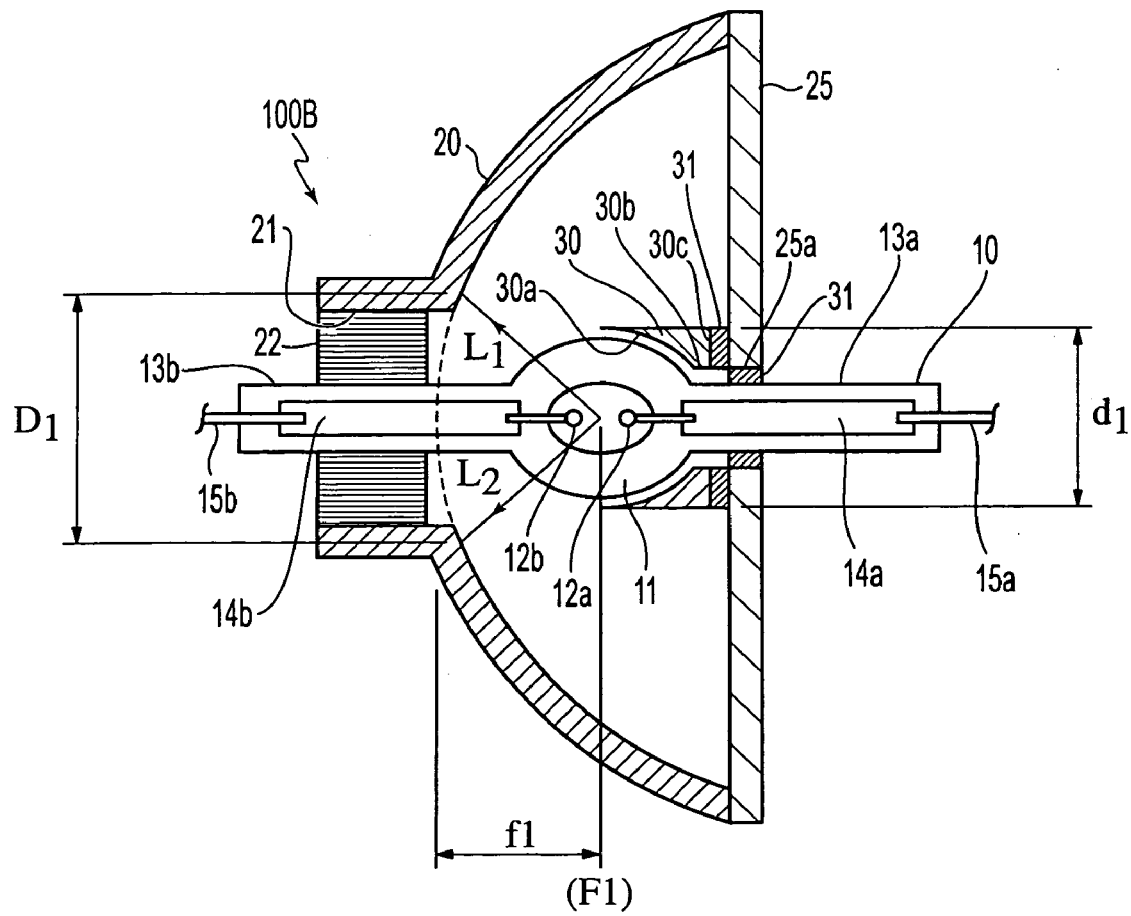
FIG. 4 is a schematic of the illumination device of of exemplary Embodiment 3 of the invention.

FIG. 4 is a schematic of an illumination device 100B of exemplary Embodiment 3. The configuration of the illumination device 100B is basically identical to that of the illumination device 100 of exemplary Embodiment 1 shown in FIG. 1 and FIG. 2 and differs from the illumination device 100 of exemplary Embodiment 1 in the following aspects.

The second reflecting mirror 30 and the transparent plate 25 are fixed by fixedly attaching the surface 30c of the second reflecting mirror 30 to the transparent plate 25, with the adhesive 31. The transparent plate 25 and light-emitting tube 10 are fixed to each other by fixedly attaching the through orifice 25a of the transparent plate 25 to the sealing member 13a of the light-emitting tube 10 via the adhesive 31. The second reflecting mirror 30 and the light-emitting tube 10 are not in contact with each other.

With exemplary Embodiment 3, heat from the light-emitting tube 10 is radiated by heat conduction to the transparent plate 25 via the adhesive 31. Furthermore, heat that was transferred from the light-emitting member 11 to the second reflecting mirror 30 by convective heat transfer or radiation heat transfer is transferred from the surface 30c of the second reflecting mirror 30 to the transparent plate 25 via the adhesive 31. Therefore, heat of the light-emitting tube 10 is radiated by conduction to the transparent plate 25 via the adhesive 31 and the second reflecting mirror 30. Accordingly, an increase in temperature of the light-emitting tube 10 can be reduced or prevented even if heat radiated from the light-emitting member 11 is impeded by the installation of the second reflecting mirror 30 in the light-emitting tube 10.

Exemplary Embodiment 4

Figure 5:
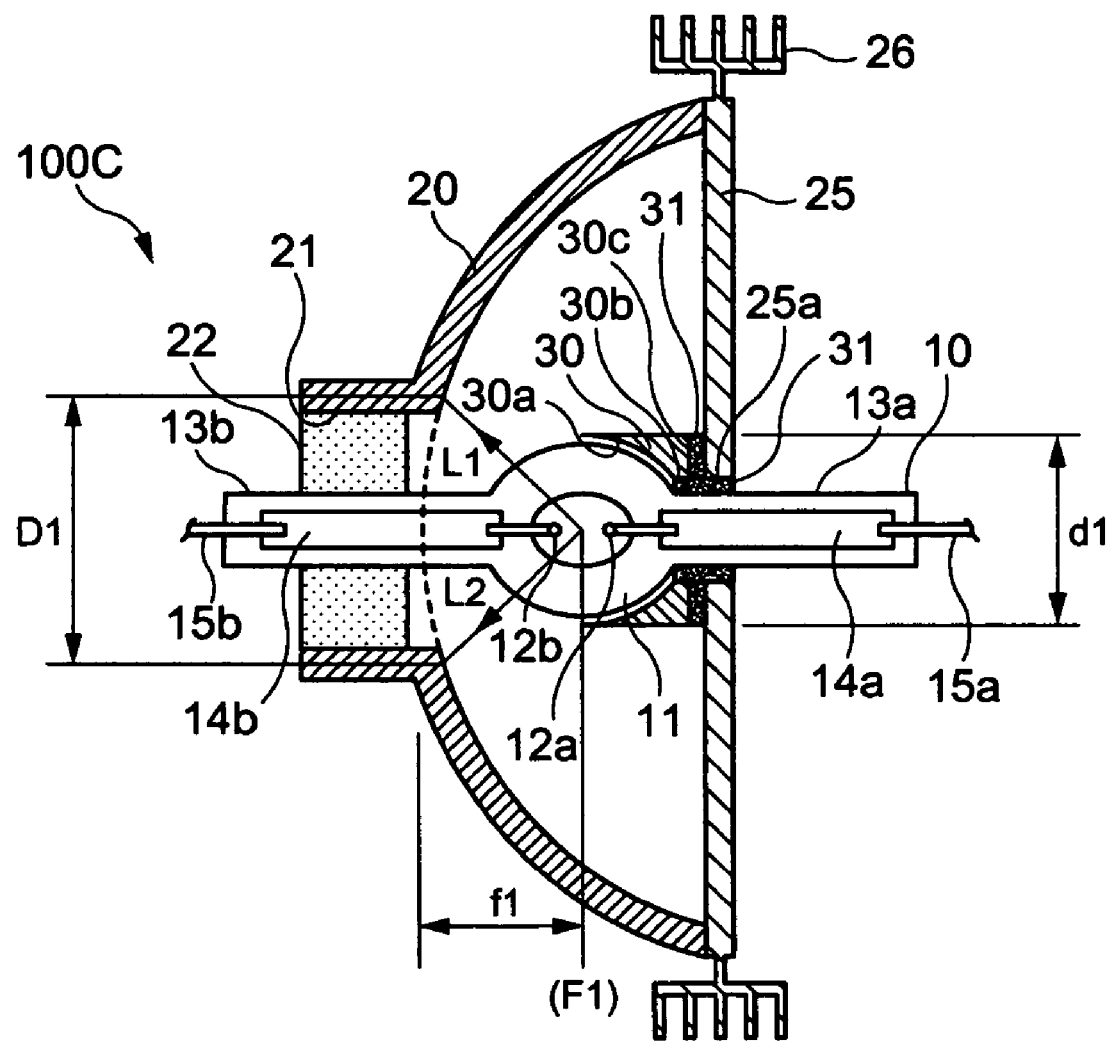
FIG. 5 is a schematic of the illumination device of exemplary Embodiment 4 of the invention.

FIG. 5 is a schematic of an illumination device 100C of exemplary Embodiment 4. The configuration of the illumination device 100C is basically identical to that of the illumination device 100 of exemplary Embodiment 1 shown in FIG. 1 and FIG. 2 and differs from the illumination device 100 of exemplary Embodiment 1 in the following aspects.

The transparent plate 25 and the surface 30c of the second reflecting mirror 30 are fixed by fixedly attaching via the adhesive 31. Both the through orifice 25a of the transparent plate 25 and the through orifice 30b of the second reflecting mirror 30 are fixed by fixedly attaching to the sealing member 13a of the light-emitting tube 10 via the adhesive 31.

Further, as shown in FIG. 5, heat radiation fins 26 are provided at the outer peripheral end of the transparent plate 25.

With exemplary Embodiment 4, in addition to the effect of the above-described exemplary Embodiment 1, because heat transferred from the light-emitting tube 10 to the transparent plate 25 via the second reflecting mirror and adhesive 31 is radiated into the air by the heat radiation fins 26, heat transfer from the light-emitting tube 10 can be further enhanced and an increase in temperature of the light-emitting tube 10 can be reduce or prevented.

Exemplary Embodiment 5

Figure 6:
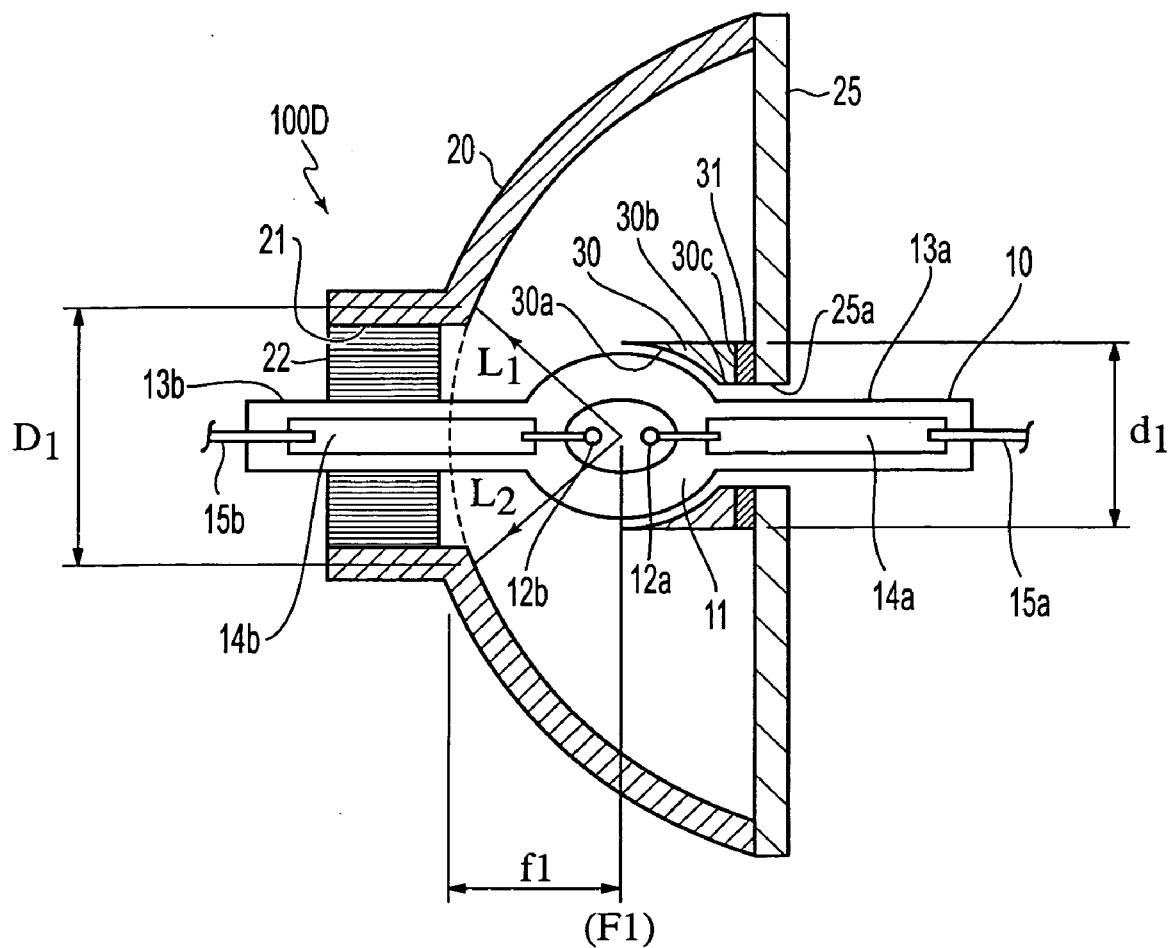
FIG. 6 is a schematic of the illumination device of exemplary Embodiment 5 of the invention.

FIG. 6 is a schematic of an illumination device 100D of exemplary Embodiment 5 of the invention. The configuration of the illumination device 100D is basically identical to that of the illumination device 100 of exemplary Embodiment 1 shown in FIG. 1 and FIG. 2 and differs from the illumination device 100 of exemplary Embodiment 1 in the following aspects.

In the present exemplary embodiment, the transparent plate 25 and second reflecting mirror 30 are fixed by fixedly attaching the surface 30c of the second reflecting mirror 30 to the transparent plate 25 via the adhesive 31. A gap is provided between the through orifice 25a of the transparent plate 25, the through orifice 30b of the second reflecting mirror 30, and the sealing member 13b of the light-emitting tube 10.

With the configuration of exemplary Embodiment 5, the light-emitting tube 10 is cooled by using the air passing through the gap formed between the through orifice 25a of the transparent plate 25, the through orifice 30b of the second reflecting mirror 30, and the sealing member 13a of the light-emitting tube 10 and an increase in temperature of the light-emitting tube 10 can be prevented or reduced.

Exemplary Embodiment 6

Figure 7:
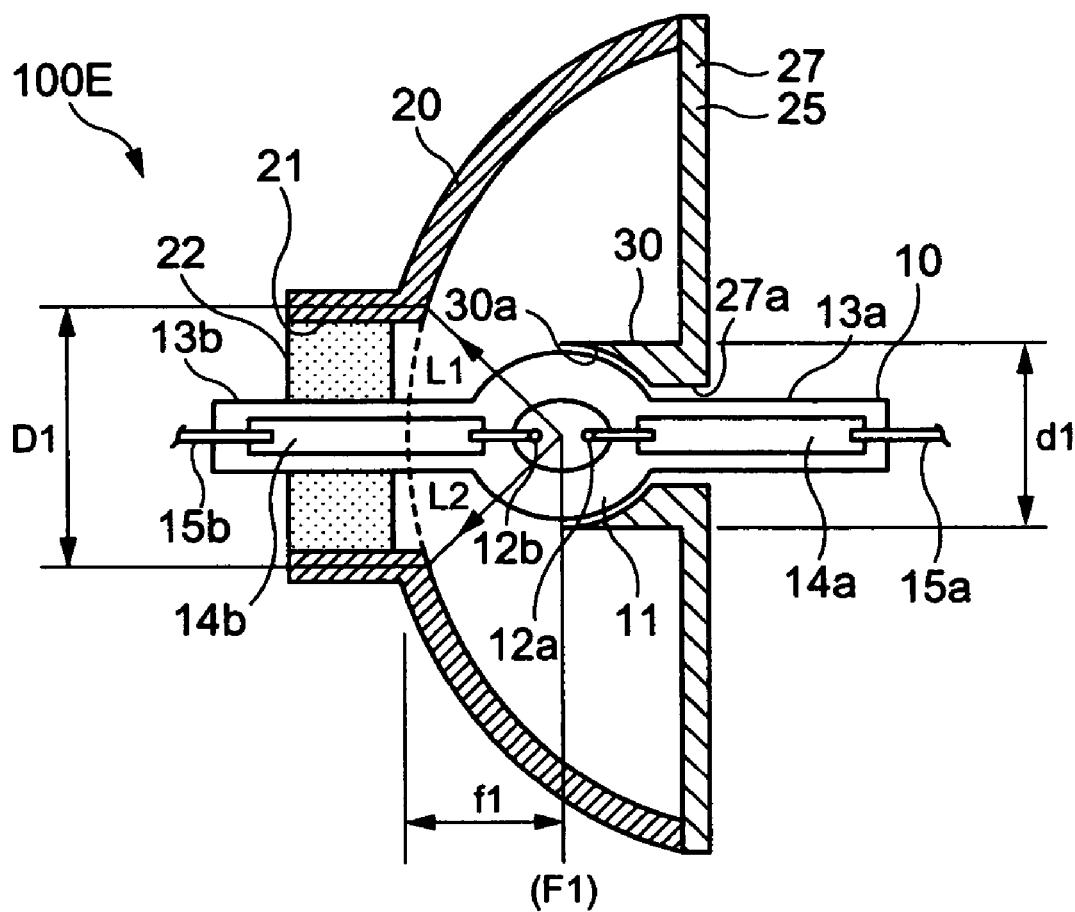
FIG. 7 is a schematic of the illumination device of exemplary Embodiment 6 of the invention.

FIG. 7 is a schematic of an illumination device 100E of exemplary Embodiment 6. The configuration of the illumination device 100E is basically identical to that of the illumination device 100 of exemplary Embodiment 1 shown in FIG. 1 and FIG. 2 and differs from the illumination device 100 of exemplary Embodiment 1 in the following aspects.

The illumination device 100E includes a transparent plate 27 in which the transparent plate 25 and the second reflecting mirror 30 are integrated. The transparent plate 27 is fixed to the open end of the first reflecting mirror 20.

With the configuration of exemplary Embodiment 6, the light-emitting tube 10 is cooled by using the air passing through the gap formed between a through orifice 27a of the transparent plate 27 and the sealing member 13a of the light-emitting tube 10 and an increase in temperature of the light-emitting tube 10 can be prevented or reduced.

As shown in FIG. 7, the transparent plate 25 and the second reflecting mirror 30 can be integrally molded by press molding, thereby allowing the number of parts to be reduced.

Exemplary Embodiment 7

Figure 8:
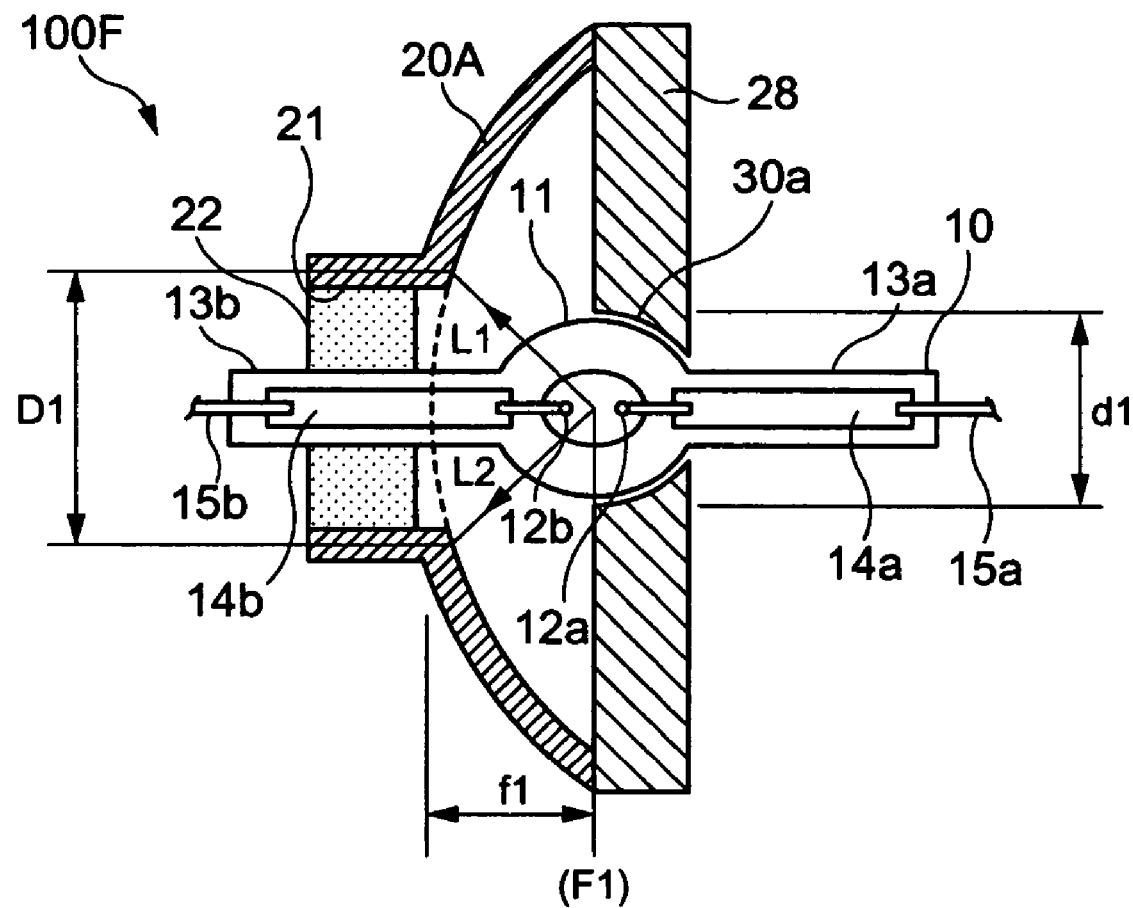
FIG. 8 is a schematic of the illumination device of exemplary Embodiment 7 of the invention.

FIG. 8 is a schematic of an illumination device 100F of exemplary Embodiment 7. The configuration of the illumination device 100F is basically identical to that of the illumination device 100E of exemplary Embodiment 6 shown in FIG. 7 and differs from the illumination device 100E of exemplary Embodiment 6 in the following aspects.

The first reflecting mirror 20A is large enough to have a reflective surface capable of reflecting the light emitted from almost a half of the rear side of the light-emitting member 11. A transparent plate 28 is thick enough to form a reflective surface 30a covering almost half of the front side of the light-emitting member 11. The transparent plate 28 is fixed to the open end of the first reflecting mirror 20A.

With such a configuration of exemplary Embodiment 7, the effect identical to that of Embodiment 6 is obtained and also a reflective surface 30a functioning as the second reflective surface can be easily formed on the transparent plate 28 by cutting, polishing, or the like, even on a material which is impossible to press mold.

Exemplary Embodiment 8

Figure 9:
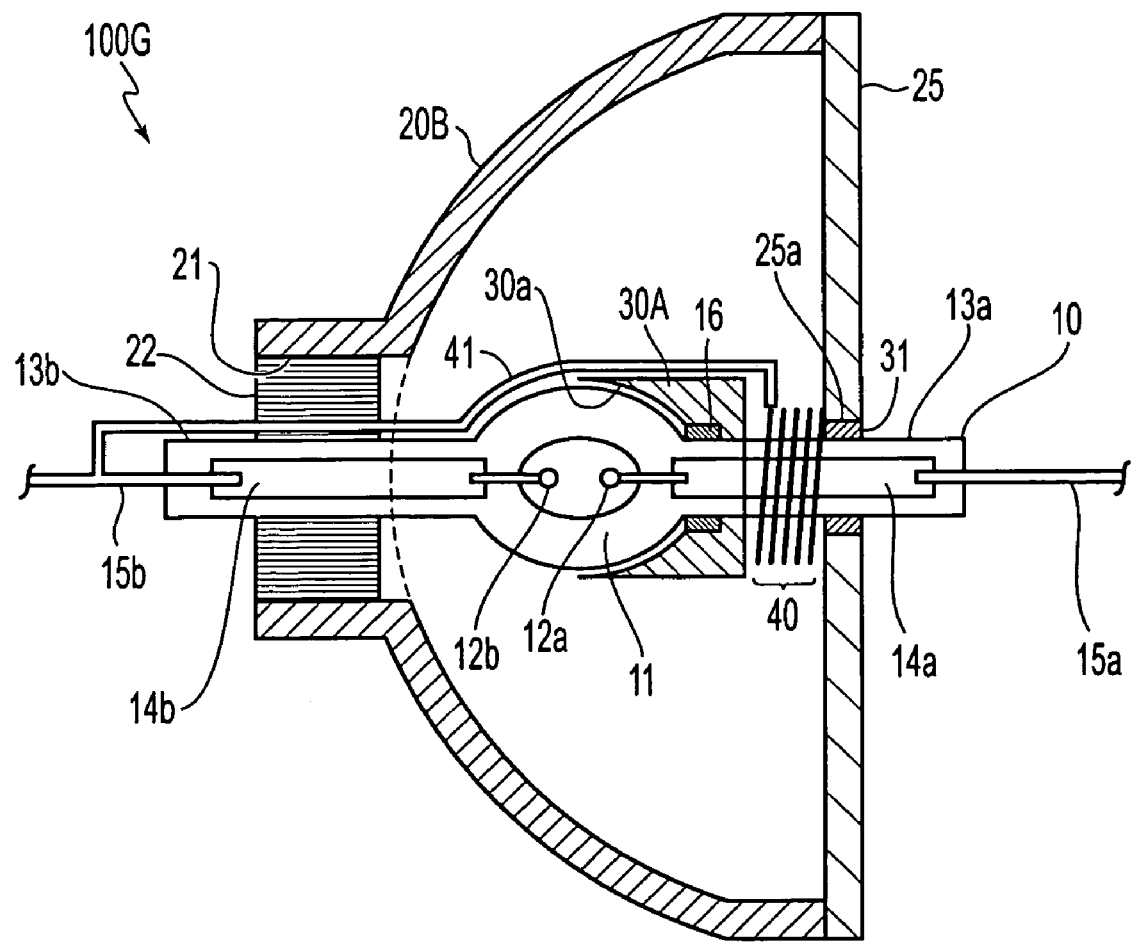
FIG. 9 is a schematic of the illumination device of exemplary Embodiment 8 of the invention.

FIG. 9 is a schematic of an illumination device 100G of exemplary Embodiment 8. The configuration of the illumination device 100G is basically identical to that of the illumination device 100 of exemplary Embodiment 1 shown in FIG. 1 and FIG. 2 and differs from the illumination device 100 of exemplary Embodiment 1 in the following aspects.

In the case of the illumination device 100G of exemplary Embodiment 8, the light-emitting tube 10 includes a protruding member 16 as a member separate from the light-emitting tube 10 in the vicinity of the light-emitting member 11 of the sealing member 13a. The second reflecting mirror 30A is pressed against the protruding member 16 by using the elastic force of a spring 40 wound around the sealing member 13a, thereby securing the second reflecting mirror 30 to the sealing member 13a, while leaving a gap between the reflective surface 30a of the reflecting mirror 30 and the outer peripheral surface of the light-emitting member 11. With consideration for thermal expansion of the sealing member 13a, the spring 40 is wound to have a diameter larger than the outer diameter of the sealing member 13a. The spring 40 can be pressed against the light-emitting member 11, for example, by using the transparent plate 25. Furthermore, the transparent plate 25 is connected in a fixedly attached state to the sealing member 13a via the adhesive 31. Moreover, the spring 40 is composed of an electrically conductive member and one end of the spring 40 is electrically connected to a lead wire 15b extending from the sealing member 13b on the side opposite to that where the spring 40 is mounted.

In the illumination device 100G of exemplary Embodiment 8, with respect to the increase in heat generation caused by the installation of the second reflecting mirror 30A, the increase in temperature of the light-emitting tube 10 can be prevented or reduced by air cooling in the gap between the reflective surface 30a of the second reflecting mirror 30A and the outer peripheral surface of the light-emitting member 11 or by heat radiation due to heat conduction from the light-emitting tube 10 to the transparent plate 25 via the adhesive 31, while the light utilization efficiency is increased owing to the operation of the second reflecting mirror 30A. Furthermore, electrically connecting one end of the spring 40 to the lead wire 15b extending from the sealing member 13b on the side opposite to that where the spring 40 is mounted induces discharge breakdown and facilitates ignition at the ignition start time of the light-emitting tube 10.

Manufacture of Illumination Device

The manufacturing sequence of illumination devices 100 to 100D of exemplary Embodiments 1 to 5 will be described below. The explanation herein will be provided under an assumption that the transparent plate 25 and the second reflecting mirror 30 are produced separately. First, data relating to the structure of the light-emitting tube 10 and first reflecting mirror 20 are collected for each light-emitting tube 10. Those data include electrode spacing in the light-emitting member 11, shape and dimensions of each part of the light-emitting tube 10, shape and dimensions of the first reflecting mirror 20, and focal point of the first reflecting mirror 20 (first focal point and second focal point when the first reflecting mirror is an ellipsoid of revolution). Then, the light emission state from the light-emitting member 11 of each light-emitting tube 10 is simulated by using a computer or the like based on those data. Then, a second reflecting mirror 30 corresponding to each light-emitting tube 10 is designed based on the simulation of light emission state from the light-emitting member 11. This design can be also carried out by using computer simulation or the like. Such a simulation determines a shape (outer diameter, inner diameter, shape of reflective surface, and the like) that enables the operation of the second reflecting mirror 30 that has already been explained. The second reflecting mirror 30 corresponding to each light-emitting tube 10 is then fabricated based on the design. The second reflecting mirror 30 is then fixed to the sealing member 13a of the light-emitting tube 10 and/or transparent plate 25, while conducting adjustment so that the reflective surface 30a of the second reflecting mirror 30 thus fabricated encloses almost half of the front side of the light-emitting member 11 and the incident light emitted from the center of the light-emitting member 11 and falling upon the second reflecting mirror 30 coincides with the normal to the reflective surface 30a of the second reflecting mirror 30.

The adhesive 31 used to fix the sealing member 13a of the light-emitting tube 10, the through orifice 25a of the transparent plate 25 and/or the sealing member 13a of the light-emitting tube 10, the through orifice 30b of the second reflecting mirror 30 and/or the transparent plate 25, and the surface 30c of the second reflecting mirror 30 may be a silica-alumina mixed adhesive that can withstand high temperatures and has good thermal conductivity or an inorganic adhesive including aluminum nitride as the main component. An adhesive with a trade name SUMICERAM (manufactured by Asahi Chemical Industries Co., Ltd., SUMICERAM is a trade name of Sumitomo Chemical Industries Co., Ltd.) is an example of such adhesives. The adhesive 31 may be applied in a location such that the light beam (UV, IR, leaked visual light, and the like) that was emitted from the light-emitting member 11 and arrived by passing through the reflective surface 30a of the second reflecting mirror 30 is not shielded.

The first reflecting mirror 20 and the light-emitting tube 10 are then arranged by almost matching the first focal point of the first reflecting mirror 20 with the center between the electrodes 12 of the light-emitting tube 10 having the second reflecting mirror 30 fixed thereto in the above-described manner. The light-emitting tube 10 and the first reflecting mirror 20 are fixed in correct positions by adjusting the position of the light-emitting tube 10 with respect to the first reflecting mirror 20 so that the brightness in a predetermined positions has a maximum.

The illumination devices 100E to 100G of exemplary Embodiments 6 to 8 shown in FIGS. 7 to 9 can be also manufactured following this procedure.

The illumination devices provided with constituent features to prevent or reduce the increase in temperature of the light-emitting tube 10 caused by the installation of the second reflecting mirror 30 of exemplary Embodiments 1 to 8 of the invention, which are shown in FIGS. 1 to 9, are not limited to applications to the illumination devices 100 to 100G shown in FIGS. 1 to 9. They may be also applied in a variety of modes, without departing from the essence of the invention, to other illumination devices including the first reflecting mirror 20 holding the light-emitting tube 10 and the transparent plate 25 disposed in the distal end portion of the first reflecting mirror 20, wherein the reflective surface of the second reflecting mirror 30 being disposed opposite to the first reflecting mirror 20 so as to surround the periphery of the light-emitting member 11 of the light-emitting tube 10. For example the following modifications are possible.

Heat radiation fins 26 of exemplary Embodiment 4 may be incorporated in the configurations of exemplary Embodiments 1 to 3 and exemplary Embodiments 5 to 8. Incorporating the heat radiation fins 26 of exemplary Embodiment 4 into the configurations of exemplary Embodiments 1 to 3 and exemplary Embodiments 5 to 8 makes it possible to obtain additionally the effect of exemplary Embodiment 4 in the exemplary Embodiments 1 to 3 and exemplary Embodiments 5 to 8.

In exemplary Embodiments 1 to 4 illustrated by FIGS. 1 to 5, the transparent plate 25 and second reflecting mirror 30 may be fabricated by integral molding. Furthermore, in exemplary Embodiments 1 to 5 shown in FIGS. 1 to 5, when the second reflecting mirror 30 is fixed to the transparent plate 25, the second reflecting mirror 30 and/or transparent plate 25 may be brought into contact only with the sealing member 13a in the mode allowing for heat conduction, without fixing them to the sealing member 13a.

In exemplary Embodiments 1 to 4, it is not necessary that the transparent plate 25 be fixed to the open end of the first reflecting mirror 20.

A projector 1000 equipped with the illumination device 100 is described hereinbelow. But the projector 1000 can similarly include any illumination device of illumination devices 100A to 100G.

Figure 10:
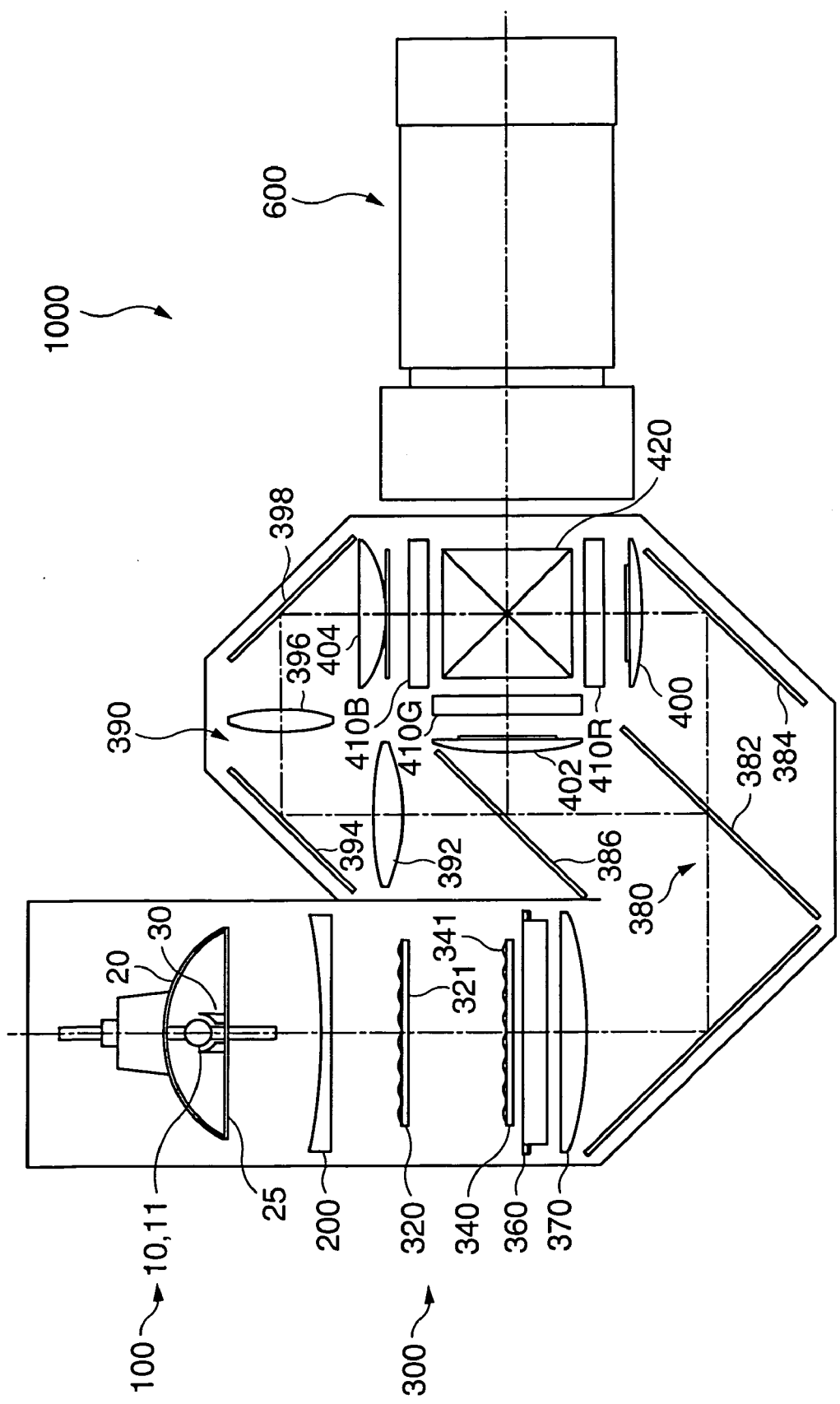
FIG. 10 is a schematic of a projector including the illumination device of the aforementioned exemplary embodiments.

FIG. 10 is a schematic of the projector 1000 equipped with the illumination device 100. The optical system thereof includes an illumination optical system 300 equipped with the illumination device 100 including a light-emitting tube 10, a first reflecting mirror 20, a transparent plate 25, and a second reflecting mirror 30, and a device to adjust the emitted light from the illumination device 100 to the prescribed light, a color light separation optical system 380 including dichroic mirrors 382, 386, a reflecting mirror 384, and the like, a relay optical system 390 having an incident side lens 392, a relay lens 396, and reflecting mirrors 394, 398, field lenses 400, 402, 404 and liquid-crystal panels 410R, 410G, 410B as light modulation device corresponding to each color light, a cross dichroic prism 420 which is a color light synthesis optical system, and a projection lens 600.

The operation of the projector 1000 of the above-described configuration will be described below. First, the emitted light from the rear side, with respect to the center of the light-emitting member 11 of the light-emitting tube 10, is reflected by the first reflecting mirror 20 and directed forward of the illumination device 100. Further, the emitted light from the front side, with respect to the center of the light-emitting member 11, is reflected by the second reflecting mirror 30, returned to the first reflecting mirror 20, and then reflected by the first reflecting mirror 20 and directed forward of the illumination device 100.

The light that exits the illumination device 100 enters a concave lens 200, where the propagation direction of the light is adjusted to be almost parallel to the optical axis 1 of the illumination optical system 300, and then falls on small lenses 321 of a first lens array 320 constituting an integrator lens. The first lens array 320 splits the incident light into a plurality of partial luminous fluxes, the number of the fluxes corresponding to the number of small lenses 321. Each partial luminous flux that exits the first lens array 320 falls on a second lens array 340 constituting an integrator lens having small lenses 341 each corresponding to a respective small lens 321. The light outgoing from the second lens array 340 is condensed in the vicinity of a corresponding polarization separation membrane (not shown in the figure) of a polarization conversion element array 360. At this time, the adjustment is made with a light shielding plate (not shown in the figure) such that of the incident light falling on the polarization conversion element array 360, the light falls only on the portion corresponding to the polarization separation membrane.

In the polarization conversion element array 360, the luminous flux incident thereupon is converted into a linearly polarized light of the same type. A plurality of partial luminous fluxes with polarization directions arranged with the polarization conversion element array 360 enter an superimposing lens 370 where each partial luminous flux illuminating the liquid-crystal panels 410R, 410G, 410B is adjusted so as to superimpose the corresponding panel surface.

The color light separation optical system 380 includes first and second dichroic mirrors 382, 386 and has a function of separating the light emitted from the illumination optical system into color light of three colors: red, green, and blue. The first dichroic mirror 382 transmits the red color light component of the light exiting the superimposing lens 370 and reflects the blue color light component and green color light component. The red color light that passed through the first dichroic mirror 382 is reflected by a reflecting mirror 384, passes through the field lens 400 and reaches the liquid-crystal panel 410R for red color light. The field lens 400 converts each partial light flux emitted from the superimposing lens 370 into a luminous flux parallel to the central axis (main beam) thereof. Field lenses 402, 404 provided in front of other liquid-crystal panels 410G, 410B operate in a similar manner.

Further, of the blue color light and green color light reflected by the first dichroic mirror 382, the green color light is reflected by the second dichroic mirror 386, passes through the field lens 402 and reaches the liquid-crystal panel 410G for green color light. The blue color light is transmitted via the second dichroic mirror 386, passes through the relay optical system 390, specifically, the incidence side lens 392, the reflecting mirror 394, the relay lens 396, and the reflecting mirror 398 and reaches the liquid-crystal panel 410B for blue color light through the field lens 404. The relay optical system 390 is used for the blue color light in order to reduce or prevent the decrease in light utilization efficiency caused by light scattering and the like, because the optical path length of the blue color light is longer than that of other color lights. Thus, it is used so that partial luminous fluxes falling on the incidence side lens 392 propagate without deterioration to the field lens 404. The relay optical system 390 was constructed to pass blue color light of the three color lights. But it may be also constructed to pass other color lights, for example, red color light.

The three liquid-crystal panels 410R, 410G, 410B modulate each incident color light according to given image information and form images of each color light. Further, polarization plates are usually provided on the light incoming surface side and light outgoing surface side of the three liquid-crystal panels 410R, 410G, 410B.

Modulated light beams of three colors outgoing from the aforementioned liquid-crystal panels 410R, 410G, 410B enter the cross dichroic prism 420 having a function of a color light synthesis optical system forming color images by synthesizing those modulated light beams. In the cross dichroic prism 420, a dielectric multilayer film reflecting red color light and a dielectric multilayer film reflecting blue color light form an almost X-like configuration on the boundary of four right prisms. Modulated light beams of three colors: red, green, and blue, are synthesized by those dielectric multilayer films and a synthesized light to project a color image is formed. The synthesized light synthesized in the cross dichroic prism 420 finally enters the projection prism 600 and is projected and displayed therefrom as a color image on a screen.

With the above-described projector 1000, due to the above-described operation of the illumination device 100 or any of illumination devices 100A to 100G used therein, the brightness of the projector 1000 can be increased and service life thereof can be extended.

The projector in accordance with an aspect of the invention is not limited to the above-described exemplary embodiment and can be implemented in a variety of modes, without departing from the essence thereof. For example, the following modifications are possible.

In the above-described examples, two lens arrays 320, 340 were used to split the light of the illumination device 100 into a plurality of partial luminous fluxes, but an aspect of the invention is also applicable to a projector using no such lens array.

In the above-described examples, the explanation was conducted with respect to an example of a projector using liquid-crystal panels as alight modulation device, but an aspect of the invention is also applicable to a projector using a modulator other than a liquid-crystal panel, for example, a modulator in which pixels are composed of micromirrors.

In the above-described examples, the explanation was conducted with respect to an example of a projector using three light modulation devices, but an aspect of the invention is also applicable to a projector using one, two, four, or more light modulation device.

In the above-described exemplary embodiments, the explanation was conducted with respect to an example of a projector using liquid-crystal panels of a transmission type, but an aspect of the invention is also applicable to a projector using liquid-crystal panels of a reflection type. Here, the "transmission type" means a type in which a light modulation device, such as a liquid-crystal panel transmits the light, and the "reflection type" means a type in which it reflects the light. Furthermore, the light modulation device is not limited to a liquid-crystal panel and may be, for example, a device using micromirrors. Furthermore, the illumination optical system in accordance with an aspect of the invention can be used in both the projectors of a front projection type in which projection is carried out from the observation direction and the projectors of a rear projection type in which projection is carried out from the side opposite to the observation direction.

What is claimed is:

1. An illumination device, comprising:
   a light-emitting tube having a light-emitting member and sealing members located on two sides of the light emitting member, the light emitting member including a pair of electrodes, light emission being carried out between the pair of electrodes;
   a first reflecting mirror to hold the light-emitting tube, reflect the light emitted from the light-emitting tube, and direct the light forward;
   a transparent plate formed at a distal end portion of the first reflecting mirror;
   a second reflecting mirror that encloses a front portion of the light-emitting member and reflects the light from the light-emitting member toward the first reflecting mirror, the second reflecting mirror being fixedly attached to at least one of the sealing members and the transparent plate,
   the transparent plate and the second reflecting mirror being brought into contact or mounted in a fixedly attached condition, and at least one of the transparent plate and the second reflecting mirror being brought into contact or fixedly attached to the sealing member.

2. The illumination device according to claim 1, the fixed attachment being carried out with an adhesive.

3. The illumination device according to claim 2, the adhesive being an aluminum nitride-based adhesive or an adhesive based on a mixture of silica and alumina.

4. The illumination device according to claim 1, the transparent plate being composed of either a transparent material with a low thermal expansion coefficient or a transparent material with a high thermal conductivity.

5. The illumination device according to claim 1, a substrate of the second reflecting mirror being composed of either a material with a low thermal expansion coefficient or a material with a high thermal conductivity.

6. The illumination device according to claim 1, a heat radiation fin being provided at an outer peripheral portion of the transparent plate.

7. The illumination device according to claim 1, one end of one of the sealing members protruding from a region surrounded by the first reflecting mirror and the transparent plate through the transparent plate into an open region.

8. An illumination device, comprising:
   a light-emitting tube having a light-emitting member and sealing members located on both sides of the light-emitting member, the light-emitting member including a pair of electrodes, light emission is carried out between the pair of electrodes;
   a first reflecting mirror to hold the light-emitting tube, and reflect the light emitted from the light-emitting tube, and direct the light forward;
   a transparent plate disposed in a distal end portion of the first reflecting mirror;
   a second reflecting mirror that encloses a front portion of the light-emitting member and reflects the light from the light-emitting member toward the first reflecting mirror, the second reflecting mirror being fixedly attached to the transparent plate; and
   a gap being provided between the transparent plate, the second reflecting mirror, and the light-emitting tube.

9. The illumination device according to claim 8, the fixed attachment being carried out with an adhesive.

10. The illumination device according to claim 9, the adhesive being an aluminum nitride-based adhesive or an adhesive based on a mixture of silica and alumina.

11. The illumination device according to claim 8, the transparent plate being composed of either a transparent material with a low thermal expansion coefficient or a transparent material with a high thermal conductivity.

12. The illumination device according to claim 8, a substrate of the second reflecting mirror being composed of either a material with a low thermal expansion coefficient or a material with a high thermal conductivity.

13. The illumination device according to claim 8, a heat radiation fin being provided at an outer peripheral portion of the transparent plate.

14. The illumination device according to claim 8, one end of one of the sealing members protruding from a region surrounded by the first reflecting mirror and the transparent plate through the transparent plate into an open region.

15. An illumination device, comprising:
a light-emitting tube having a light-emitting member and sealing members located on two sides of the light emitting member, the light emitting member including a pair of electrodes, light emission being carried out between the pair of electrodes;
a first reflecting mirror to hold the light-emitting tube, reflect the light emitted from the light-emitting tube, and direct the light forward;
a transparent plate disposed in a distal end portion of the first reflecting mirror; and
a second reflecting mirror that encloses a front portion of the light-emitting member and reflects the light from the light-emitting member toward the first reflecting mirror, the second reflecting mirror is formed integrally with the transparent plate.

16. The illumination device according to claim 15, the transparent plate being composed of either a transparent material with a low thermal expansion coefficient or a transparent material with a high thermal conductivity.

17. The illumination device according to claim 15, a substrate of the second reflecting mirror being composed of either a material with a low thermal expansion coefficient or a material with a high thermal conductivity.

18. The illumination device according to claim 15, a heat radiation fin being provided at an outer peripheral portion of the transparent plate.

19. The illumination device according to claim 15, one end of one of the sealing members protruding from a region surrounded by the first reflecting mirror and the transparent plate through the transparent plate into an open region.

20. An illumination device, comprising:
a light-emitting tube having a light-emitting member and sealing members located on two sides of the light emitting member, the light emitting member including a pair of electrodes, light emission being carried out between the pair of electrodes;
a first reflecting mirror to hold the light-emitting tube, reflect the light emitted from the light-emitting tube, and direct the light forward;
a transparent plate disposed in a distal end portion of the first reflecting mirror; and a second reflecting mirror that encloses a front portion of the light-emitting member and reflects the light from the light-emitting member toward the first reflecting mirror, the second reflecting mirror being disposed opposite to an outer peripheral surface of the light-emitting member with a gap being formed therebetween and being fixedly attached by being pressed against an outer periphery of one of the sealing members in the vicinity of the light-emitting member with a spring wound around the outer peripheral surface with a gap therebetween.

21. The illumination device according to claim 20, the spring being composed of an electrically conductive coil and one end of the electrically conductive coil being connected to a lead wire led out from a sealing member on a side opposite to that where the spring is disposed.

22. The illumination device according to claim 20, the transparent plate being fixedly attached to the sealing member with an adhesive.

23. The illumination device according to claim 22, the adhesive being an aluminum nitride-based adhesive or an adhesive based on a mixture of silica and alumina.

24. The illumination device according to claim 20, the transparent plate being composed of either a transparent material with a low thermal expansion coefficient or a transparent material with a high thermal conductivity.

25. The illumination device according to claim 20, a substrate of the second reflecting mirror being composed of either a material with a low thermal expansion coefficient or a material with a high thermal conductivity.

26. The illumination device according to claim 20, a heat radiation fin being provided at an outer peripheral portion of the transparent plate.

27. The illumination device according to claim 20, one end of one of the sealing members protruding from a region surrounded by the first reflecting mirror and the transparent plate through the transparent plate into an open region.

28. A projector, comprising:
an illumination device;
a light modulation device to receive an incident light from the illumination device and modulate the incident light according to a given image information, the illumination device being an illumination device including: a light-emitting tube having a light-emitting member and sealing members located on two sides of the light emitting member, the light emitting member including a pair of electrodes, light emission being carried out between the pair of electrodes;
a first reflecting mirror to hold the light-emitting tube, reflect the light emitted from the light-emitting tube, and direct the light forward;
a transparent plate disposed in a distal end portion of the first reflecting mirror; and
a second reflecting mirror, that encloses a front portion of the light-emitting member and reflects the light from the light-emitting member toward the first reflecting mirror, being fixedly attached to at least one of the sealing members and the transparent plate,
the transparent plate and the second reflecting mirror being brought into contact or fixedly attached, and at least one of the transparent plate and the second reflecting mirror being brought into contact or fixedly attached to the sealing member.

29. The projector according to claim 28, the fixed attachment being carried out with an adhesive.

30. The projector according to claim 28, the adhesive being an aluminum nitride-based adhesive or an adhesive based on a mixture of silica and alumina.

31. The projector according to claim 28, the transparent plate being composed of either a transparent material with a low thermal expansion coefficient or a transparent material with a high thermal conductivity.

32. The projector according to claim 28, a substrate of the second reflecting mirror being composed of either a material with a low thermal expansion coefficient or a material with a high thermal conductivity.

33. The projector according to claim 28, a heat radiation fin being provided at an outer peripheral portion of the transparent plate.

34. The projector according to claim 28, one end of one of the sealing members protruding from a region surrounded by the first reflecting mirror and the transparent plate through the transparent plate into an open region.

35. A projector, comprising:
an illumination device;
a light modulation device to receive an incident light from the illumination device and modulate the incident light according to a given image information;
the illumination device being an illumination device including:
a light-emitting tube having a light-emitting member and sealing members located on two sides of the light emitting member, the light emitting member including a pair of electrodes, light emission being carried out between the pair of electrodes;
a first reflecting mirror to hold the light-emitting tube, reflect the light emitted from the light-emitting tube, and direct the light forward;
a transparent plate disposed in a distal end portion of the first reflecting mirror;
a second reflecting mirror that, encloses a front portion of the light-emitting member and reflects the light from the light-emitting member toward the first reflecting mirror, being fixedly attached to the transparent plate; and
a gap being provided between the transparent plate, the second reflecting mirror, and the light-emitting tube.

36. The projector according to claim 35, the fixedly attached attachment being carried out with an adhesive.

37. The projector according to claim 36, the adhesive being an aluminum nitride-based adhesive or an adhesive based on a mixture of silica and alumina.

38. The projector according to claim 35, the transparent plate being composed of either a transparent material with a low thermal expansion coefficient or a transparent material with a high thermal conductivity.

39. The projector according to claim 35, a substrate of the second reflecting mirror being composed of either a material with a low thermal expansion coefficient or a material with a high thermal conductivity.

40. The projector according to claim 35, a heat radiation fin being provided at an outer peripheral portion of the transparent plate.

41. The projector according to claim 35, one end of one of the sealing members protruding from a region surrounded by the first reflecting mirror and the transparent plate through the transparent plate into an open region.

42. A projector, comprising:
an illumination device;
a light modulation device to receive an incident light from the illumination device and modulate the incident light according to a given image information;
the illumination device being an illumination device including:
a light-emitting tube having a light-emitting member and sealing members located on two sides of the light emitting member, the light emitting member including a pair of electrodes, light emission being carried out between the pair of electrodes;
a first reflecting mirror to hold the light-emitting tube, reflect the light emitted from the light-emitting tube, and direct the light forward; and
a transparent plate disposed in a distal end portion of the first reflecting mirror; and
a second reflecting mirror that encloses a front portion of the light-emitting member and reflects the light from the light-emitting member toward the first reflecting mirror, the second reflecting mirror being formed integrally with the transparent plate.

43. The projector according to claim 42, the transparent plate being composed of either a transparent material with a low thermal expansion coefficient or a transparent material with a high thermal conductivity.

44. The projector according to claim 42, a substrate of the second reflecting mirror being composed of either a material with a low thermal expansion coefficient or a material with a high thermal conductivity.

45. The projector according to claim 42, a heat radiation fin being provided at an outer peripheral portion of the transparent plate.

46. The projector according to claim 42, one end of one of the sealing members protruding from a region surrounded by the first reflecting mirror and the transparent plate through the transparent plate into an open region.

47. A projector, comprising:
an illumination device and a light modulation device to receive an incident light from the illumination device and modulate the incident light according to a given image information, the illumination device including:
a light-emitting tube having a light-emitting member and sealing members located on two sides of the light emitting member, the light emitting member including a pair of electrodes, light emission being carried out between the pair of electrodes;
a first reflecting mirror to hold the light-emitting tube, reflect the light emitted from the light-emitting tube, and direct the light forward;
a transparent plate disposed in a distal end portion of the first reflecting mirror;
a second reflecting mirror that encloses a front portion of the light-emitting member and reflects the light from the light-emitting member toward the first reflecting mirror, the second reflecting mirror being disposed opposite to an outer peripheral surface of the light-emitting member with a gap being formed therebetween and being fixedly attached by being pressed against an outer periphery of the sealing member in the vicinity of the light-emitting member with a spring wound around the outer peripheral surface with a gap therebetween.

48. The projector according to claim 47, the spring being composed of an electrically conductive coil and one end of the electrically conductive coil being connected to a lead wire led out from a sealing member on the side opposite to that where the spring is disposed.

49. The projector according to claim 47, the transparent plate being fixedly attached to the sealing member with an adhesive.

50. The projector according to claim 49, the adhesive being an aluminum nitride-based adhesive or an adhesive based on a mixture of silica and alumina.

51. The projector according to claim 47, the transparent plate being composed of either a transparent material with a low thermal expansion coefficient or a transparent material with a high thermal conductivity.

52. The projector according to claim 47, the second reflecting mirror including a substrate composed of either a material with a low thermal expansion coefficient or a material with a high thermal conductivity.

53. The projector according to claim 47, a heat radiation fin being provided at an outer peripheral portion of the transparent plate.

54. The projector according to claim 47, one end of one of the sealing members protruding from a region surrounded by the first reflecting mirror and the transparent plate through the transparent plate into an open region.

* * * * *